(12) United States Patent
Benhase et al.

(10) Patent No.: US 7,251,753 B2
(45) Date of Patent: Jul. 31, 2007

(54) APPARATUS, SYSTEM, AND METHOD FOR IDENTIFYING A FAULTY COMMUNICATION MODULE

(75) Inventors: Michael Thomas Benhase, Tucson, AZ (US); Susan Kay Candelaria, Tucson, AZ (US); Paul Matthew Richards, Tucson, AZ (US); Brian Anthony Rinaldi, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 10/666,660

(22) Filed: Sep. 17, 2003

(65) Prior Publication Data

US 2005/0060611 A1    Mar. 17, 2005

(51) Int. Cl.
G06F 11/00     (2006.01)
(52) U.S. Cl. ............................................. 714/42; 714/4
(58) Field of Classification Search ................... 714/42, 714/4
See application file for complete search history.

(56) References Cited

U.S. PATENT DOCUMENTS

| | | | |
|---|---|---|---|
| 3,848,116 A | 11/1974 | Moder et al. ................ | 235/153 |
| 4,412,281 A | 10/1983 | Works ........................ | 364/200 |
| 4,870,643 A | 9/1989 | Bultman et al. ........... | 371/11.1 |
| 5,319,751 A | 6/1994 | Garney ....................... | 395/200 |
| 5,333,285 A | 7/1994 | Drerup ....................... | 395/575 |
| 5,420,988 A | 5/1995 | Elliott ........................ | 395/275 |
| 5,487,149 A | 1/1996 | Sung .................... | 395/182.08 |
| 5,712,972 A | 1/1998 | Kakkar ................ | 395/183.02 |
| 5,721,911 A | 2/1998 | Ha et al. .................... | 395/611 |
| 5,748,925 A | 5/1998 | Waclawsky et al. ........ | 395/311 |
| 5,815,647 A | 9/1998 | Buckland et al. ...... | 395/182.01 |
| 5,826,032 A * | 10/1998 | Finn et al. .................. | 709/236 |
| 6,151,649 A | 11/2000 | Liong et al. ................ | 710/126 |
| 6,151,689 A * | 11/2000 | Garcia et al. ................ | 714/49 |
| 6,425,004 B1 * | 7/2002 | Hardjono .................... | 709/223 |

(Continued)

FOREIGN PATENT DOCUMENTS

WO      WO 0031986 A2     6/2000

OTHER PUBLICATIONS

Microsoft Computer Dictionary, 4th. Ed., 1999, Microsoft Press, p. 221.*

Primary Examiner—Robert Beausoliel
Assistant Examiner—Christopher McCarthy
(74) Attorney, Agent, or Firm—Kunzler & McKenzie

(57) ABSTRACT

An apparatus, method, and system associates an identifier with a data packet. The identifier uniquely identifies a communication module, such as a host interface card, within a data storage system. In operation, a computer host sends a data packet to a server. The communication module receives the data packet and associates an identifier, unique to the communication module, with the data packet. The data packet is stored in a disk array, such as a Redundant Array of Independent Disks (RAID) system. When the computer host later requests the stored data packet, a validation module, which may be implemented within a PCI adapter such as a host interface card, retrieves the data packet and determines whether the data packet is corrupt. If the data packet is corrupt, the validation module identifies which host interface card corrupted the data with the use of the unique identifier associated with the data packet. The faulty communication module may then be removed from operation in the data storage system.

30 Claims, 6 Drawing Sheets

U.S. PATENT DOCUMENTS

| | | |
|---|---|---|
| 6,430,714 B1 | 8/2002 | McAdam et al. ........... 714/704 |
| 6,557,112 B1 * | 4/2003 | Shimada ....................... 714/4 |
| 2003/0115516 A1 * | 6/2003 | Goldberg et al. ........... 714/712 |
| 2005/0188279 A1 * | 8/2005 | Gibble et al. ................ 714/42 |

* cited by examiner

APPARATUS, SYSTEM, AND METHOD FOR IDENTIFYING A FAULTY COMMUNICATION MODULE

BACKGROUND OF THE INVENTION

1. Field of the Invention

This invention relates to an apparatus, system, and method for identifying faulty communication modules. Specifically, the invention relates to an apparatus, system, and method for identifying faulty communication modules within a data storage system.

2. Description of the Related Art

Typical data storage systems include a client and a server. The client, commonly referred to as the host, transmits data to the server. The server, in turn, stores the data. Various types of adapters may be used for communication between the host and the server. A commonly used adapter is the peripheral component interconnect (PCI) adapter. One representative example of a PCI adapter is a host interface card. Often, the server includes a plurality of host interface cards available for connecting a plurality of hosts to the server. Data transmitted to the server is temporarily stored within a host interface card before the data is written to a permanent storage media within the server, such as a disk array. In addition, when a host requests data stored on the server, host interface cards retrieve the data from the permanent storage media and transmit the data to the host.

Occasionally during the data storage and retrieval process, the host interface card identifies data that is corrupt. Corrupt data often means that one of the host interface cards that processed the data has malfunctioned and may continue corrupting other data. It is desirable to identify the malfunctioning host interface card to prevent further data corruption.

However, identifying the malfunctioning host interface card may be difficult, because data is often stored on the server using one host interface card and retrieved using a different host interface card. Conventional data storage systems logically conclude that the host interface card that discovered and reported the corrupt data is the faulty host interface card. As a result, data storage systems remove that host interface card from operation when, in reality, the host interface card that originally processed the data may be the faulty host interface card that corrupted the data. Consequently, a properly functioning host interface card may be removed or disabled while a faulty host interface card remains in operation, corrupting data within the data storage system.

FIG. 1 illustrates a representative example of a conventional data storage system 100 having a faulty host interface card 106a. The system 100 stores data packets sent from a host 102 to a server 104. Typical data packets include data and a header, which identifies the type of data contained within the data packet. The server 104 includes a plurality of host interface cards 106 for communicating with one or more hosts 102. Most of the host interface cards 106 are operable host interface cards 106b-d. Certain host interface cards 106a may, however, be faulty.

The host interface cards 106 are configured to receive, temporarily store, and transmit data packets sent from the host 102 to a symmetric multiprocessor 114. The symmetric multiprocessor 114 includes a data cache 116, non-volatile storage 120, and one or more disk controller cards 118. The symmetric multiprocessor 114 stores each data packet in the cache 116 and optionally the non-volatile storage 120 according to various data storage parameters. In response to data storage parameters, the disk controller 118 writes each data packet to a disk group 122 where the data is permanently stored. The various components of the server 104 communicate by way of a central communication bus 124.

Occasionally, a data packet becomes corrupted while being transmitted from the host 102 to the server 104. The data packet may also become corrupted while being transmitted throughout the various components of the server 104. When data is corrupted, data is changed within the data packet. Generally, data storage systems 100 validate the integrity of data packets to prevent transmitting or storing corrupted data.

The host 102 evaluates the data packet and associates a CRC (cyclic redundancy check) value with the data packet before sending the data packet to the server 104. Typically, a CRC value is four bytes containing a 32-bit binary value. When the host interface card 106 receives the data packet from the host 102, the host interface card 106 computes a conventional CRC data verification to validate the integrity of the data packet received. First, the host interface card 106 evaluates the data packet to calculate a CRC value. Next, the host interface card 106 compares the calculated CRC value with the CRC value associated with the data packet. Then, if the calculated CRC value matches the CRC value associated with the data packet, the host interface card 106 determines that the data packet is valid. If the calculated CRC value does not match the CRC value in the data packet, the host interface card 106 determines that the data packet is corrupt. If the data packet is corrupt, the host interface card 106 rejects the data packet and sends an error to the host 102. If the data packet is valid, the host interface card 106 continues to process the data packet.

LRC (longitudinal redundancy check) data verification is another method for validating the integrity of data packets that typically involves less processing overhead than CRC data verification. The LRC value differs from the CRC value in that it is two bytes containing a sixteen-bit binary value, a much smaller size to process and store. Consequently, LRC data verification is desirable to validate data integrity as the data packet is transmitted between components within the server 104.

As part of the LRC data verification, the host interface card 106 evaluates the data packet and generates an LRC value. The host interface card 106 then associates the LRC value with the data packet before transmitting the data packet to the symmetric multiprocessor 114. When the symmetric multiprocessor 114 receives the data packet from the host interface card 106, the symmetric multiprocessor 114 computes a conventional LRC data verification to validate the integrity of the data packet.

Often, due to a fault in the memory or processor of a faulty host interface card 106, the host interface card 106 may corrupt the data packet after the CRC data verification has been completed, but before the LRC data verification has been executed. As a result, the faulty host interface card 106 may send a corrupt data packet to the symmetric multiprocessor 114, which executes LRC data verification and compares the calculated LRC value with the LRC value associated with the data packet. If the calculated LRC value matches the LRC value in the data packet, the symmetric multiprocessor 114 determines that the data packet is valid. If the calculated LRC value does not match the LRC value in the data packet, the symmetric multiprocessor 114 determines that the data packet is corrupt and rejects the data packet, creating an error in the data storage process. However, the symmetric multiprocessor 114 stores the data packet in both the cache 116 and optionally the non-volatile storage 120, if the LRC data verification validates the data packet.

In the depicted example, the faulty host interface card 106 has corrupted the data packet after the completion of the CRC data verification. Consequently, the faulty host interface card 106 evaluates a corrupt data packet, generates an LRC value, and inserts the LRC value into the corrupt data packet. Furthermore, the symmetric multiprocessor 114 receives the corrupt data packet, evaluates the corrupt data packet, and calculates an LRC value to compare against the LRC value in the corrupt data packet. The LRC data verification does not detect corrupted data packages in the depicted example, because the calculated LRC value and the LRC value in the data packet were calculated from evaluating a corrupt data packet.

After the data packet is validated, the cache 116 or non-volatile storage 120 sends the data packet to the disk controller 118, which then sends the data packet to the disk group 122, where it is stored indefinitely. The disk group 122 may receive a corrupt data packet and execute LRC data verification as previously explained. The LRC data verification does not detect the corrupt data packet because the calculated LRC value matches the LRC value associated with the data packet.

Subsequently, if the host 102 requests the stored data packet, the disk group 122 sends the data packet into cache 116 where the symmetric multiprocessor 114 performs LRC data verification. As previously explained, LRC data verification does not detect a corrupt data packet. The symmetric multiprocessor 114 evaluates the corrupt data packet, calculates an LRC value, and compares the calculated LRC value with the LRC value associated with the data packet.

The symmetric multiprocessor 114 then sends the data packet to a host interface card 106d. Because the data server 104 includes a plurality of host interface cards 106, the symmetric multiprocessor 114 often sends data packets to a different host interface card 106b-d than the host interface card 106a that originally received the data packet from the host 102.

The host interface card 106d executes LRC data verification to validate the integrity of the data packet. The host interface card 106d evaluates the data packet and generates an LRC value. If the calculated LRC value matches the LRC value associated with the data packet, the host interface card 106d executes CRC data verification.

In the depicted example, the host interface card 106d evaluates the data packet and calculates a CRC value. Since the faulty host interface card 106a corrupted the data packet after CRC data verification had been executed, the functioning host interface card 106d evaluates corrupt data and calculates a CRC value that differs from the original CRC value calculated by the host 102 and associated with the data packet. The host interface card 106d sends an error message to the symmetric multiprocessor 114 indicating that the data package is corrupt. Since there are no conventional means to identify which of the plurality of host interface cards 106 corrupted the data packet, the symmetric multiprocessor 114 erroneously concludes that the host interface card 106d that sent the error message is the faulty host interface card.

Generally, to prevent future errors, the symmetric multiprocessor 114 disables, commonly known as "fencing," the host interface card 106d that sent the error message. Additionally, the symmetric multiprocessor 114 may take the host interface card 106d that sent the error message off-line. The symmetric multiprocessor 114 might also reset the host interface card 106d in an attempt to fix the host interface card 106d that sent the error message. Accordingly, the symmetric multiprocessor 114 may send an error message to the host 102, indicating that the original data packet is corrupt.

Consequently, under some circumstances, the conventional data storage system 100 may erroneously disable the properly functioning host interface card 106d that sent the error message. The symmetric multiprocessor 114 in such a case fails to properly identify the faulty host interface card 106a that actually corrupted the data packet. As a result, the faulty host interface card 106a continues operating and may continue to corrupt data.

What is needed is a method that correctly identifies the faulty host interface card responsible for corrupting the data packet. Furthermore, a data storage system is needed that identifies the faulty host interface card, takes appropriate measures to fix or disable the faulty host interface, and permits properly operating host interface cards to remain operational.

BRIEF SUMMARY OF THE INVENTION

The present invention has been developed in response to the present state of the art, and in particular, in response to the problems and needs in the art that have not yet been fully solved by currently available data storage systems. Accordingly, the present invention has been developed to provide a process, apparatus, and system for identifying faulty communication modules that overcome many or all of the above-discussed shortcomings in the art.

In one aspect of the present invention, an apparatus for identifying a faulty communication module is provided. The apparatus in one embodiment includes a communication module configured to associate an identifier for the communication module with a data packet. Preferably, the identifier uniquely identifies the communication module. Thus, if a communication module corrupts a data packet, a data storage system can correctly identify and take appropriate measures to fix or disable the faulty communication module. The communication module may be a peripheral component interconnect (PCI) adapter, such as a host interface card, configured to operate using well known communications protocols including Peripheral Component Interconnect (PCI), Small Computer System Interface (SCSI), or the like. The communication module is further configured to execute CRC and LRC data verification for a data packet.

The apparatus preferably further includes a storage module, in communication with the communication module, configured to store a data packet. The storage module is also configured to execute LRC data verification for the data packet. The storage module is further configured to take appropriate measures to fix or disable the faulty communication module identified by the identifier associated with the data packet.

The apparatus also preferably includes a validation module, in communication with the storage module, configured to determine that a data packet is corrupt and identify the faulty communication module with the use of the identifier. The validation module may be implemented within a PCI adapter, such as a host interface card. The validation module is configured to retrieve the data packet from the storage module and execute LRC data verification for the data packet. The validation module is further configured to report the faulty communication module identified by the identifier to the storage module.

In another aspect of the present invention, one embodiment of a method for identifying a faulty communication module includes associating an identifier for the communication module with the data packet and identifying the faulty communication module by way of the identifier. The method also includes determining that the data packet is corrupt and reporting the faulty communication module associated with the identifier. The method further includes fixing or removing the faulty communication module from operation, which may include resetting or disabling the faulty communication module.

Various elements of the present invention may be combined into a system for identifying a faulty communication module. The system in one embodiment includes a computer host configured to send and receive data packets and a server in communication with the computer host. In one embodiment, the server includes a communication module configured to receive the data packets and to associate an identifier for the communication module with the data packets. The server also preferably includes a storage module configured to store the data packets and a validation module configured to determine that one of the data packets is corrupt. The validation module is further configured to identify a faulty communication module with the use of the identifier. In one embodiment, the validation module reports to the storage module that the communication module associated with the identifier is faulty.

The present invention facilitates identifying a faulty communication module. In one embodiment, a unique identifier associated with the data packet identifies the communication module that corrupted the data packet. The present invention also substantially eliminates the possibility that a functioning communication module is disabled by mistake.

The various elements and aspects of the present invention provide a unique identifier associated with each communication module within a system that processes data packets. The present invention increases efficiency within a system by correctly identifying the faulty communication module to fix or disable. These and other features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
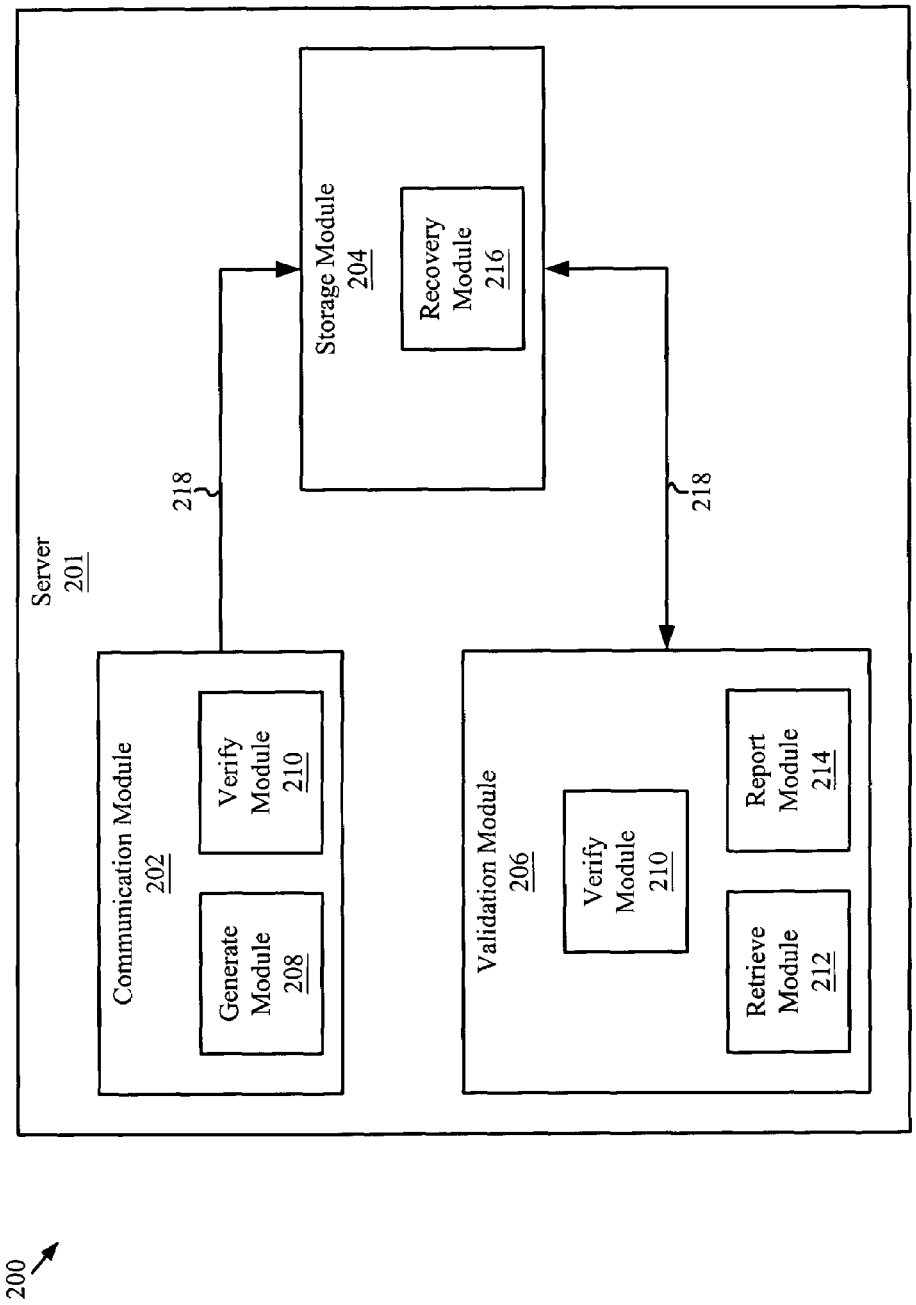
FIG. 2 is a block diagram illustrating one embodiment of an apparatus for associating an identifier in accordance with the present invention.

Referring to FIG. 2, one embodiment of an apparatus 200 for associating an identifier with a data packet is illustrated. The apparatus 200 resolves the problem of conventional data storage systems 100 erroneously disabling functioning communication modules and leaving faulty communication modules in operation. The apparatus 200 associates an identifier with a data packet to correctly identify faulty communication modules.

The apparatus 200 includes a server 201 that communicates with a host to receive data packets. In the depicted embodiment, the server 201 includes a communication module 202, a storage module 204, and a validation module 206.

The communication module 202 associates an identifier for the communication module 202 with a data packet. The communication module 202 is further configured to associate a LRC value with the data packet that is used during LRC data verification. Furthermore, the communication module is configured to send and receive data packets. The communication module 202 may be a PCI adapter such as a host interface card.

The communication module 202 includes a generation module 208 and a verification module 210. The generation module 208 generates an identifier for the communication module 202. In one embodiment, the identifier is a unique identifier for the communication module 202. The generation module 208 also evaluates the data packet and generates a CRC value to be compared against a CRC value associated with the data packet during CRC data verification. Furthermore, the generation module 208 generates a LRC value that is associated with the data packet.

The verification module 210 verifies the integrity of data packets by executing CRC and LRC data verification. As previously explained, the verification module 210 compares calculated CRC and LRC values against CRC and LRC values associated with the data packet.

The communication module 202 communicates with a storage module 204 by way of a central bus 218. The bus 218 may be a Peripheral Component Interconnection (PCI) bus. Alternate embodiments of the bus 218 may include the ISA (Industry Standard Architecture), Infiniband™, or the like. The storage module 204 stores data packets sent by the communication module 202. The storage module 204 includes a recovery module 216 that removes faulty communication modules 106a of FIG. 1 from operation by taking the faulty communication module 106a off-line.

The depicted apparatus 200 further includes a validation module 206 that communicates with the storage module 204 by way of the bus 218. The validation module 206 determines whether a data packet is corrupt. The validation module 206 also identifies the faulty communication module 202 using the identifier. Those skilled in the art will recognize that the communication module 202 and the validation module 206 may be the same.

As depicted, the validation module 206 includes a verification module 210, a retrieve module 212, and a report module 214. The retrieve module 212 retrieves a stored data packet from the storage module 204 to send to a host. Once the data packet has been retrieved, the verification module 210 verifies the integrity of the data packets by executing CRC and LRC data verification.

If the verification module 210 determines that either the CRC or the LRC data verification has failed, the verification module 210 determines that the data packet is corrupt and the report module 214 sends an error message to the storage module 204. The validation module 206 identifies the faulty communication module 202 using the identifier associated with the data packet. In one embodiment, the validation module 206 sends the hardware address of the faulty communication module 202 to the storage module 204. The recovery module 216 removes the faulty communication module 202 from operation. Accordingly, the apparatus 200 properly identifies the faulty communication module 202 and removes it from operation.

Figure 3:
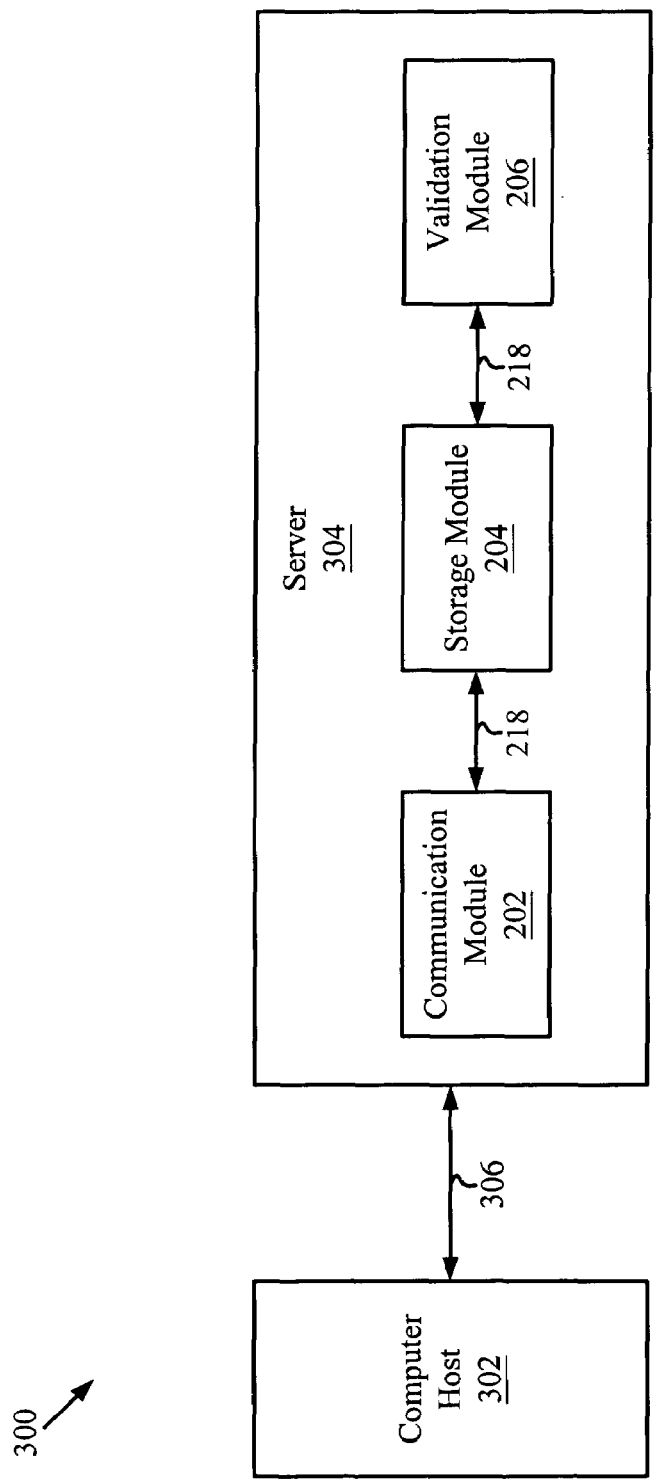
FIG. 3 is a block diagram illustrating one embodiment of a system for identifying a faulty communication module.

FIG. 3 illustrates a block diagram of one embodiment of a system 300 for identifying a faulty communication module 202. The system 300 includes a computer host 302 configured to send and receive data packets. The system 300 also includes a server 304 configured to receive data packets from the computer host 302. The server 304 includes a communication module 202, a storage module 204, and a validation module 206 as described in FIG. 2.

In the depicted embodiment, the communication module 202, the storage module 204, and the validation module 206 communicate with each other by way of a central bus 218. In one embodiment, the computer host 302 sends the data packet to the server 304 using the communication module 202. The storage module 204 stores data packets sent from the computer host 302. The validation module 206 retrieves data packets from the storage module 204, determines which data packets are corrupt, and identifies a faulty communication module 202 using the identifier associated with the corrupt data packet.

For example, the validation module 206 preferably retrieves data packets stored by the storage module 204, identifies corrupt data packets, and reports to the storage module 204 when a data packet is corrupt. More specifically, the validation module 206 executes CRC and LRC data verification on data packets retrieved from the storage module 204. If the validation module 206 determines that the data packet is corrupt, the validation module 206 communicates the identity of a faulty communication module 202 using the identifier associated with the data packet to the storage module 204. In one embodiment, the identifier is the hardware address of the faulty communication module 202.

The storage module 204 attempts to fix the faulty communication module 202 by resetting the communication module 202 identified by the identifier. If the communication module 202 continues to corrupt data, the storage module 204 proceeds to fence, or disable, the faulty communication module 202 by taking it off-line.

Figure 4:
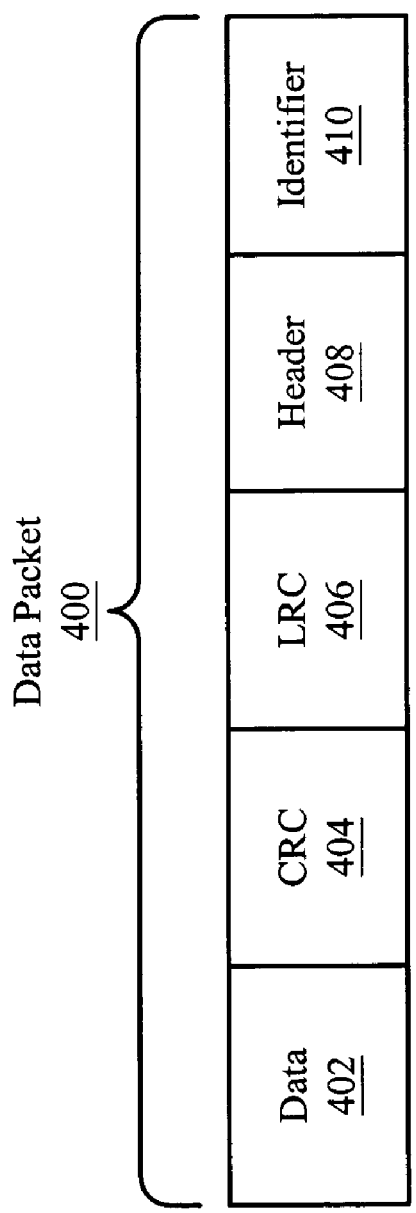
FIG. 4 is a schematic diagram illustrating one embodiment of a data packet structure for use with the present invention.

FIG. 4 illustrates one example of a data packet structure 400. The computer host 302 of FIG. 3 sends the data packet 400 to a server 304. In one embodiment, a communication module 202 receives the packet 400 sent from the computer host 302. The data packet 400 includes raw data 402, typically ones and zeros organized to represent informational data to be stored within the storage module 204.

The depicted data packet 400 also includes a typical header 408 that identifies the type of raw data 402 contained within the packet 400. The header 408 may include the size of the data packet 400. Further, the data packet 400 also includes a CRC value 404.

The CRC value 404 is generated by the computer host 302 and associated with the data packet 400 to be used during CRC data verification, as previously explained. The communication module 202 receives the data packet 400, evaluates the raw data 402, and calculates a CRC value to compare against the CRC value 404 associated with the data packet 400 to verify the integrity of the data packet 400. If the data packet 400 is valid, the communication module 202 evaluates the raw data 402, calculates the LRC value 406, and associates the LRC value 406 with the data packet 400 to be used during LRC data verification as previously explained.

Then, the communication module 202 associates an identifier 410 with the data packet 400. The identifier uniquely identifies the communication module 202 that first evaluated the data packet 400 received from the computer host 302. Preferably, the identifier 410 is a unique identifier associated with the communication module 202. Alternately, the identifier 410 may be generated based on a unique hardware address of the communication module 202. In yet another alternative embodiment, the identifier 410 is simply a unique hardware address of the communication module 202.

Initially, certain fields of the data packet structure 400 may be empty. For example, an LRC field 406 and identifier field 410 may be empty. Alternatively, the LRC field 406 and identifier field 410 may be generated and added as needed. As a data packet 400 is processed the LRC field 406 and identifier field 410 are populated as discussed above.

If the data packet 400 is determined to be corrupt during any part of the storage process, the identifier 410 may be used to identify the communication module 202 that first evaluated and corrupted the data packet 400 received from the computer host 302. The identifier 410 identifies a faulty communication module 202 so that the faulty communication module 202 may be removed from operation.

Figure 5:
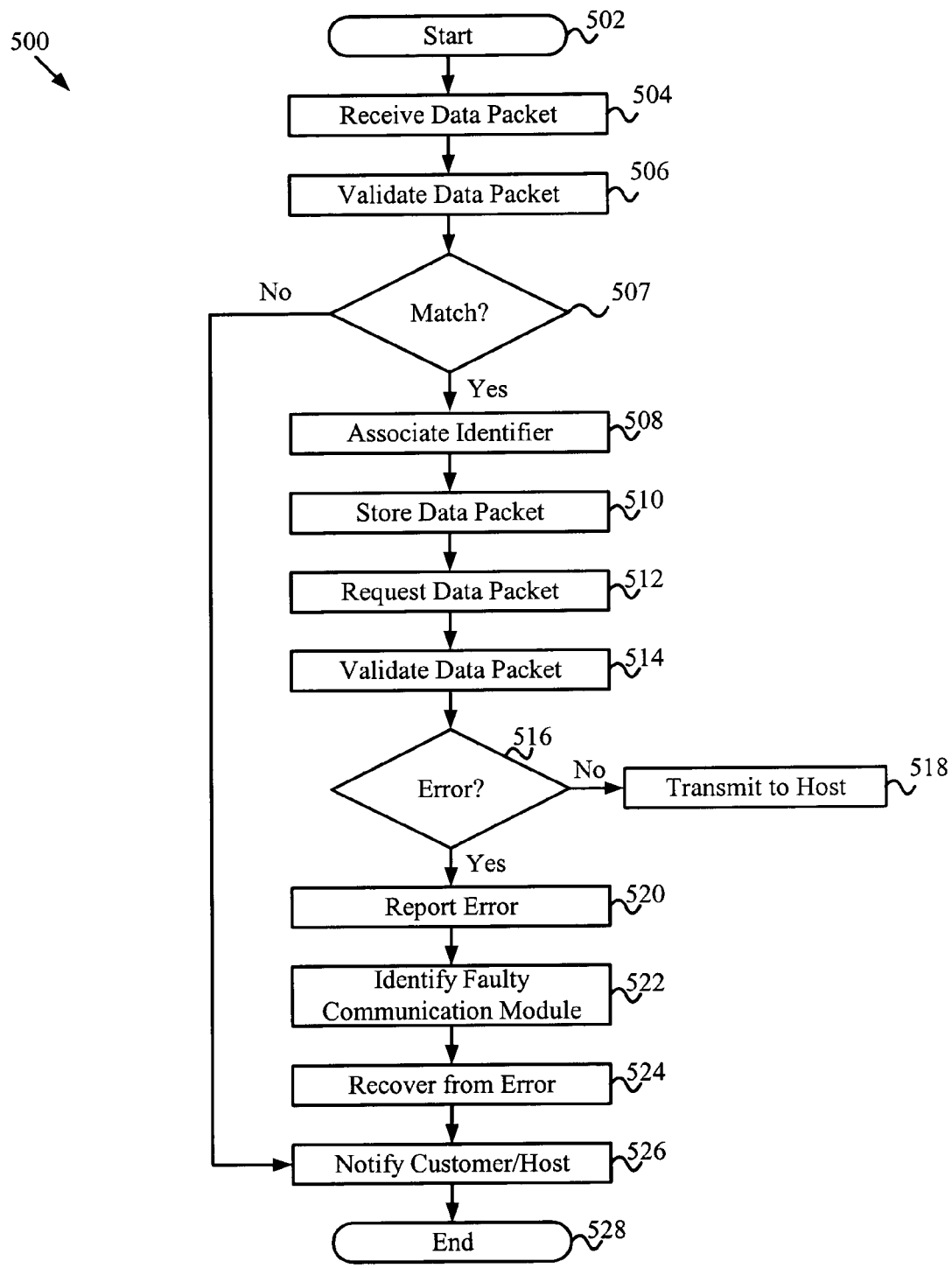
FIG. 5 is a flow chart illustrating one embodiment of a method for identifying a faulty communication module.

FIG. 5 illustrates a method 500 for associating an identifier with a data packet in order to identify a faulty communication module. The method 500 determines whether data packets 400 are corrupt and which communication module 202 within a system, such as the system 300 described in FIG. 3, corrupted the data packet 400. The method 500 starts 502 by receiving 504 a data packet 400 from a source such as a computer host 302. A communication module 202 in communication with the computer host 302 may receive the data packet 400 from the computer host 302.

The communication module 202 validates 506 the integrity of the data packet 400 after it is received from the computer host 302. Preferably, the communication module 202 performs CRC data verification to validate 506 the data packet 400. Specifically, the computer host 302 associates a CRC value 404 with the data packet before it is sent to the communication module 202. After receiving the data packet 400, the communication module 202 calculates a CRC value to compare against the CRC value 404 associated with the data packet 400. If the calculated CRC value does not match 507 the CRC value 404 associated with the data packet 400, an error is reported 526 to the customer, and the method 500 ends 528. If the calculated CRC value matches 507 the CRC value 404 associated with the data packet 400, the method 500 proceeds.

Next, the communication module 202 associates 508 an identifier 410 with the data packet 400. In one embodiment, the identifier 410 may be the hardware address or an abstraction of the hardware address of the communication module 202 that received the packet 400 from the computer host 302. In addition, the communication module 202 calculates an LRC value 406 and associates the LRC value 406 with the data packet 400 for LRC data verification. The communication module 202 then sends the data packet 400 to a storage module 204, which executes LRC data verification as previously explained. In the depicted example, the LRC data verification determines that the data packet 400 is valid. The storage module 204 proceeds to store 510 the data packet 400 for an indefinite period of time.

Later, a computer host 302 requests 512 the stored data packet 400. The validation module 206 retrieves the data packet 400 from the storage module 204, and validates 514 the integrity of the stored data packet 400 by executing LRC data verification. The validation module 206 calculates an LRC value to compare against the LRC value 406 associated with the data packet 400. After LRC data verification reveals that the data packet is valid 400, the validation module 206 next calculates a CRC value to compare against the CRC value 404 associated with the data packet 400 by the computer host 302.

If the calculated CRC value matches 516 the CRC value 404 associated with the data packet 400, the validation module 206 proceeds to send 518 the data packet 400 to the computer host 302. However, if the calculated CRC value does not match 516 the CRC value 404 associated with the data packet 400, the validation module 206 determines that the data packet 400 is corrupt, and the validation module 206 reports 520 an error to the storage module 204. The validation module 206 may also report 520 the error to the computer host 302 that requested the data packet 400. Preferably, the validation module 206 further identifies 522 the communication module 202 that corrupted the data packet 400 using the identifier 410 associated with the data packet 400.

The identifier 410 associated with the data packet 400 by the communication module 202 that first processed the data packet 400 identifies the faulty communication module 202. The identifier 410 is reported 520 to the storage module 204, which recovers 524 by fixing or disabling the identified faulty communication module 202. In one embodiment, the faulty communication module 202 is taken off-line. In additional embodiments, the faulty communication module 202 is fenced. Typically, the method 500 then notifies 526 the customer of the error and the method ends 528. Alternatively, a computer host 302 may be notified as well. The method 500 facilitates associating an identifier 410 with a data packet 400 to correctly identify a faulty communication module 202. The faulty communication module 202 may then be fixed or removed from operation.

Figure 6:
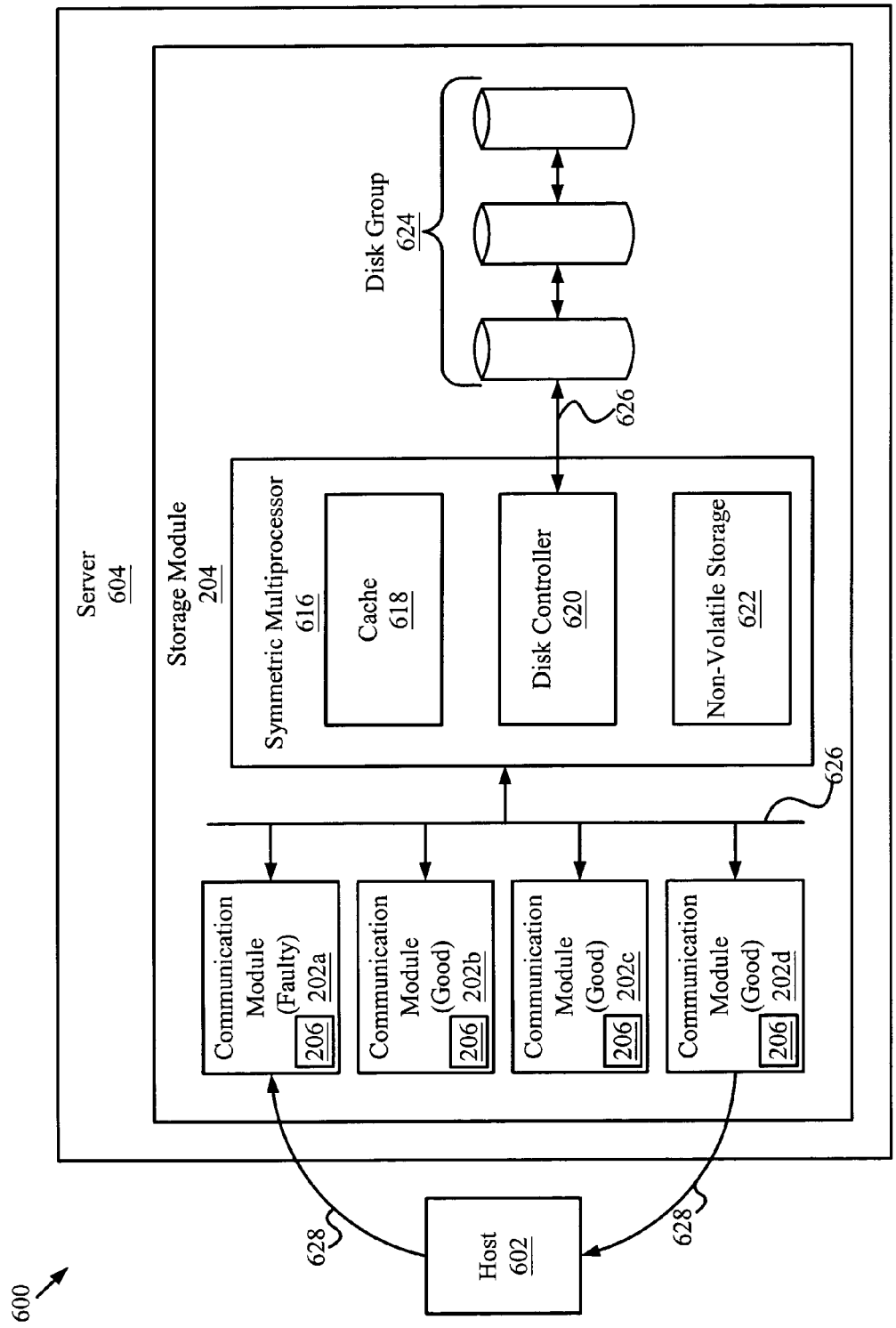
FIG. 6 is a block diagram illustrating one embodiment of a data storage system for identifying a faulty communication module according to the present invention.

FIG. 6 is a block diagram illustrating an example of a system 600 for identifying a faulty communication module 202 according to the present invention. The system 600 properly identifies a faulty communication module 202 using an identifier associated with the faulty communication module 202.

Figure 1:
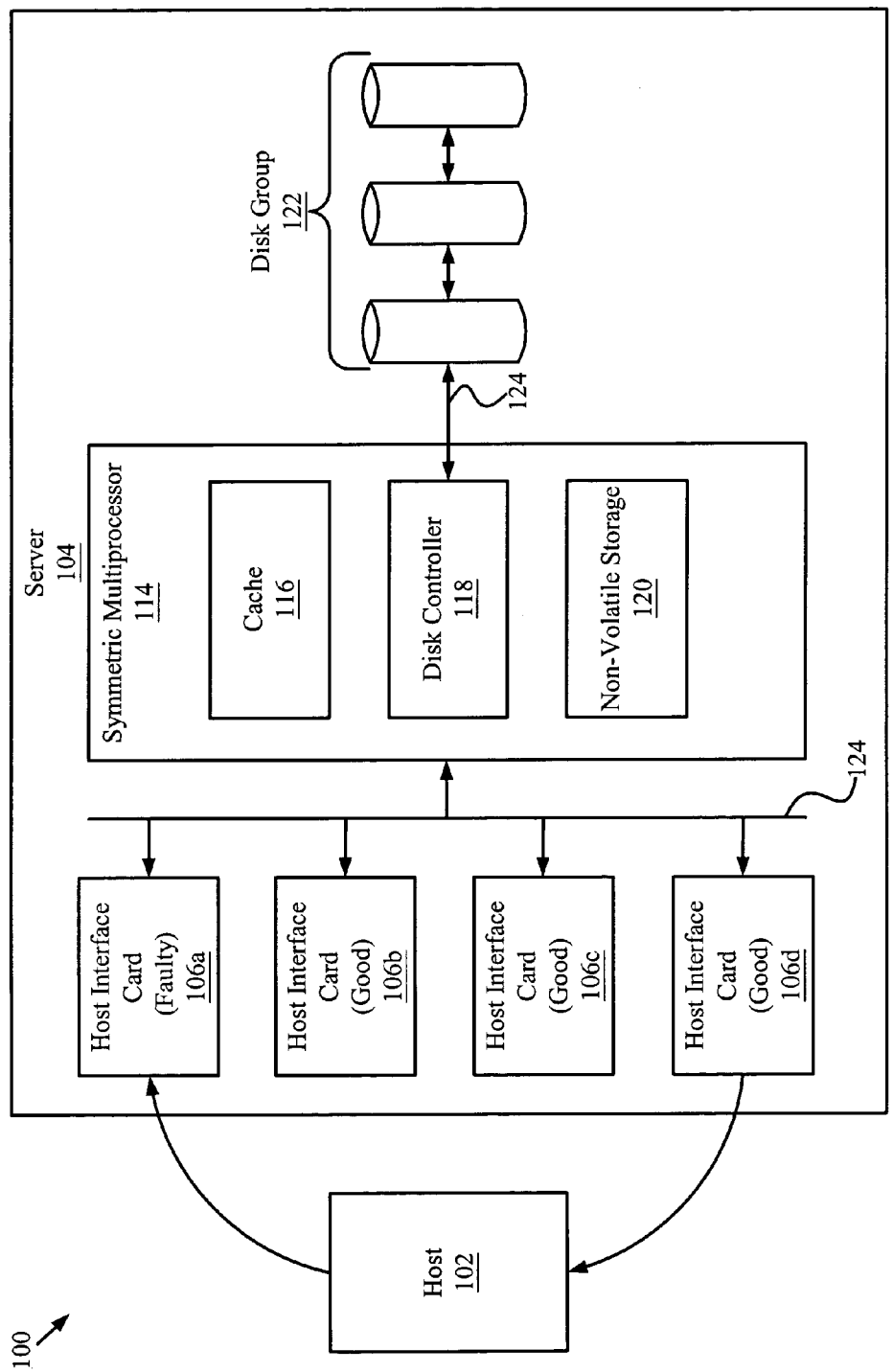
FIG. 1 is a block diagram illustrating a conventional data storage system.

The system 600 includes components similar to those described in relation to FIG. 1. A host 602, such as a computer host 302 from FIG. 3, sends data packets 400 to a server 604. Typically, the host 602 is a computer system such as an IBM system/390 or any other UNIX, Windows, or Macintosh system.

The data packets 400 may be sent to the server 604 by way of one of a plurality of communication modules 202. The communication modules 202 may comprise, for example, a host interface card. In one embodiment, the plurality of communication modules 202 include one or more Enterprise System Connection (ESCON), fiber channel, or parallel SCSI ports, which are protocols for providing communication between the host 602 and the plurality of communication modules 202.

In the depicted embodiment, the host 602 evaluates a data packet 400 and calculates a CRC value 404, which is then associated with the data packet 400. Next, the host 602 sends the data packet 400 to the server 604 where a storage module 204 directs the data packet 400 to a communication module 202. As illustrated, a faulty communication module 202a receives the data packet 400 sent from the host 602 and executes CRC data verification on the data packet 400. The CRC data verification may determine the data packet 400 to be valid. Following CRC data verification, however, the faulty communication module 202a may corrupt the raw data 402 within the data packet 400. For example, the raw data 402 may be corrupted by a faulty memory chip or processor within the faulty communication module 202a. The corrupt data packet 400 contains the CRC value 404 associated with the data packet 400 by the host 602.

The faulty communication module 202a then calculates an LRC value 406 from the corrupt data packet 400 and associates the LRC value 406 with the data packet 400. In addition, the communication module 202a associates an identifier 410 with the data packet 400. In one embodiment, the identifier 410 is a unique identifier for the communication module 202a.

The faulty communication module 202a then sends the data packet 400 to a symmetric multiprocessor 616 by way of a central bus 626. In one embodiment, the symmetric multiprocessor 616 is an IBM RS/6000. The symmetric multiprocessor 616 stores the data packet 400 in either cache 618 or non-volatile storage 622 and LRC data verification is performed again after the data packet 400 has been stored in either cache 618 or non-volatile storage 622.

Because the data packet 400 was corrupted after CRC data verification, subsequent CRC data verification might invalidate the data, while LRC data verification will continue to process the data packet 400 because the LRC value 406 was associated with the data packet 400 after the corruption occurred. Eventually, the corrupted data packet 400 moves through the disk controller 620 to a disk group 624 by way of the central bus 626. The disk controller 620 may include an IBM Serial Storage Architecture PCI card. In one embodiment, the data packet 400 is stored within a disk group 624. After the disk group 624 receives the data packet, LRC data verification is executed. The data packet 400 may then be stored as Redundant Array of Independent Disks (RAID) data.

Then, when the host 602 requests the data packet 400 from the storage module 204, the symmetric multiprocessor 616 retrieves the data packet 400 from the disk group 624 into cache 618. The symmetric multiprocessor 616 performs LRC data verification to validate the integrity of the data packet 400. Although the data packet 400 may be corrupt, the LRC data verification validates the data packet 400 as previously explained.

The data packet 400 is then sent to one of the plurality of communication modules 202. In the depicted embodiment, the data packet 400 is sent to a different communication module 202d than the communication module 202a that originally received the data packet 400. The validation module 206 within the communication module 202d performs LRC data verification and determines that the calculated LRC value and the LRC value 406 associated with the data packet 400 match. The validation module 206 then executes the CRC data verification. Because the data packet 400 is corrupted, the CRC data verification invalidates the data packet 400. The validation module 206 then notifies the storage module 204 of the error. The host 602 may or may not be notified of the corrupted data packet 400. The validation module 206 also notifies the storage module 204 of the identifier 410 associated with the data packet 400.

The identifier 410 associated with the data packet 400 allows the storage module 204 to correctly identify which one of the plurality of communication modules 202 is a faulty communication module 202a, because the identifier 410 comprises a unique identifier 410 of the original communication module 202a that corrupted the data packet 400. To prevent further corruption of data packets 400, the storage module 204 may attempt to fix the faulty communication module 202a by resetting the faulty communication module 202a. The storage module 204 may also disable, or fence, the faulty communication module 202a by taking it off-line. The functioning communication module 202d that discovered and reported the corrupt data packet 400 continues operating within the system 600.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for identifying a faulty communication module, the apparatus comprising:
    a communication module configured to verify a first check value for a data packet, append an inherent identifier for the communication module to the data packet, compute a second check value for the data packet, and include the second check value with a data packet;
    a storage module in communication with the communication module and configured to store the data packet;
    a validation module in communication with the storage module, the validation module configured to verify the second check value and the first check value to determine if the data packet is corrupt; and
    the validation module further configured to directly identify which communication module is faulty via the inherent identifier if the second check value is valid and the first check value is not valid.

2. The apparatus of claim 1, wherein the validation module is further configured to report the communication module identified by the inherent identifier as faulty.

3. The apparatus of claim 1, wherein the validation module is configured to retrieve the data packet from the storage module.

4. The apparatus of claim 1, wherein the first check value is a CRC value.

5. The apparatus of claim 1, wherein the storage module is configured to take the communication module off-line.

6. The apparatus of claim 1, wherein the identifier comprises an identifier unique to the communication module.

7. A system for identifying a faulty communication module, the system comprising:
    a computer host configured to send and receive data packets; and
    a server in communication with the computer host, the server comprising a communication module configured to verify a first check value for a data packet, append an inherent identifier for the communication module to the data packet, compute a second check value for the data packet, and include the second check value with a data packet, a storage module configured to store the data packets, and a validation module configured to verify the second check value and the first check value to determine if the data packet is corrupt, and directly identify which communication module is faulty via the inherent identifier if the second check value is valid and the first check value is not valid.

8. The system of claim 7, wherein the validation module is further configured to report the communication module identified via the inherent identifier as faulty.

9. The system of claim 7, wherein the validation module retrieves the data packets from the storage module.

10. The system of claim 7, wherein the second check value is a longitudinal redundancy check value.

11. The system of claim 7, wherein the storage module is further configured to take the communication module off-line.

12. The system of claim 7, wherein the identifier comprises an identifier unique to the communication module.

13. A method for identifying a faulty communication module, the method comprising:
    verifying a first check value for a data packet;
    appending an inherent identifier for a communication module to the data packet;
    computing a second check value for the data packet and including the second check value with the data packet;
    verifying the second check value and the first check value to determine if the data packet is corrupt; and
    directly identifying which communication module is faulty via the inherent identifier if the second check value is valid and the first check value is not valid.

14. The method of claim 13, further comprising reporting the communication module identified via the inherent identifier as faulty.

15. The method of claim 13, further storing the data packet on a storage device.

16. The method of claim 13, further comprising retrieving the data packet from a storage device.

17. The method of claim 13, wherein the first check value is a CRC value.

18. The method of claim 13, further comprising taking the communication module off-line.

19. The method of claim 13, further comprising acquiring a unique identifier for the communication module.

20. An apparatus for identifying a faulty communication module, the apparatus comprising:
- means for verifying a first check value for a data packet;
- means for appending an inherent identifier for a communication module to the data packet;
- means for computing a second check value for the data packet and including the second check value with the data packet;
- means for verifying the second check value and the first check value to determine if the data packet is corrupt; and
- means for directly identifying which communication module is faulty via the inherent identifier if the second check value is valid and the first check value is not valid.

21. The apparatus of claim 20, further comprising means for reporting the communication module identified via the inherent identifier as faulty.

22. The apparatus of claim 20, further comprising means for storing the data packet.

23. The apparatus of claim 20, further comprising means for retrieving the data packet from a storage module.

24. The apparatus of claim 20, wherein the first check value is a CRC value and the second check value is a longitudinal redundancy check value.

25. The apparatus of claim 20, further comprising means for taking the communication module off-line.

26. The apparatus of claim 20, further comprising means for acquiring the inherent identifier for the communication module.

27. An article of manufacture comprising a program storage medium readable by a processor and embodying one or more instructions executable by a processor to perform a method for identifying a faulty communication module, the method comprising:
- verifying a first check value for a data packet;
- appending an inherent identifier for a communication module to the data packet;
- computing a second check value for the data packet and including the second check value with the data packet;
- verifying the second check value and the first check value to determine if the data packet is corrupt; and
- directly identifying which communication module is faulty via the inherent identifier if the second check value is valid and the first check value is not valid.

28. The article of manufacture of claim 27, further comprising reporting the communication module identified via the inherent identifier as faulty.

29. The article of manufacture of claim 27, further comprising retrieving the data packet from a storage module.

30. The article of manufacture of claim 27, wherein the first check value is a CRC value and the second check value is a longitudinal redundancy check value.

* * * * *